United States Patent
Craig et al.

(10) Patent No.: US 7,238,231 B1
(45) Date of Patent: Jul. 3, 2007

(54) PROCESS FOR MANUFACTURING ZIRCONIA-TREATED TITANIUM DIOXIDE PIGMENTS

(75) Inventors: Daniel H. Craig, Edmond, OK (US); Jeffrey D. Elliott, Oklahoma City, OK (US); Harmon E. Ray, Yukon, OK (US)

(73) Assignee: Tronox LLC, Oklahoma City, OK (US)

( * ) Notice: Subject to any disclaimer, the term of this patent is extended or adjusted under 35 U.S.C. 154(b) by 0 days.

(21) Appl. No.: 11/600,643

(22) Filed: Nov. 16, 2006

(51) Int. Cl.
*C09C 3/06* (2006.01)
*C09C 1/36* (2006.01)
*C01G 23/047* (2006.01)
*C01G 23/07* (2006.01)
*B05D 7/00* (2006.01)

(52) U.S. Cl. .................. 106/438; 106/436; 106/437; 423/598; 427/215; 427/218

(58) Field of Classification Search ............... 106/436, 106/437, 438; 423/598; 427/215, 218
See application file for complete search history.

(56) References Cited

U.S. PATENT DOCUMENTS

| | | | |
|---|---|---|---|
| 3,208,866 A | | 9/1965 | Lewis et al. |
| 3,512,219 A | | 5/1970 | Steam et al. |
| 3,856,929 A | | 12/1974 | Angerman et al. |
| 3,867,442 A | * | 2/1975 | Logemann .................. 564/70 |
| 4,052,222 A | * | 10/1977 | Howard ..................... 106/438 |
| 4,405,376 A | | 9/1983 | Matsunaga et al. |
| 4,450,012 A | | 5/1984 | Messer et al. |
| 4,640,716 A | | 2/1987 | Cleland |
| 4,752,340 A | * | 6/1988 | Brand et al. ............... 106/448 |
| 4,759,800 A | | 7/1988 | Luginsland et al. |
| 5,201,949 A | | 4/1993 | Allen et al. |
| 5,203,916 A | | 4/1993 | Green et al. |
| 5,332,433 A | | 7/1994 | Story et al. |
| 5,700,318 A | | 12/1997 | Brand et al. |
| 5,730,795 A | * | 3/1998 | Herkimer .................... 106/446 |
| 5,730,796 A | | 3/1998 | Brand et al. |
| 5,755,870 A | | 5/1998 | Rauishankar |
| 5,814,143 A | | 9/1998 | Freeman et al. |
| 5,840,112 A | | 11/1998 | Morris et al. |
| 5,846,310 A | | 12/1998 | Noguchi et al. |
| 5,922,120 A | | 7/1999 | Subamanian et al. |
| 5,976,237 A | | 11/1999 | Halko et al. |
| 6,139,617 A | * | 10/2000 | Halko et al. ................ 106/448 |
| 6,200,375 B1 | | 3/2001 | Guez et al. |
| 6,207,131 B1 | | 3/2001 | Yuill et al. |
| 6,350,427 B1 | | 2/2002 | Yuill et al. |
| 6,562,314 B2 | | 5/2003 | Akhtar et al. |
| 6,656,261 B2 | | 12/2003 | Tear et al. |
| 7,166,157 B2 | * | 1/2007 | Drews-Nicolai et al. .... 106/447 |
| 2006/0032402 A1 | | 2/2006 | Drews-Nicholai et al. |
| 2006/0034739 A1 | | 2/2006 | Drews-Nicholai et al. |

OTHER PUBLICATIONS

T.I. Brownbridge and J. R. Brand, Photocatalytic Activity of Titaium Dioxide Pigment, Surface Coatings Australia, Sep. 1990, pp. 6-11 (Paper presented at the 32nd Annual SCAA Convention, Perth, Wash., Sep. 1990).

* cited by examiner

*Primary Examiner*—Anthony J. Green
(74) *Attorney, Agent, or Firm*—William B. Miller

(57) ABSTRACT

An improved process is described for manufacturing zirconia-treated titanium dioxide pigments, wherein the zirconia treatment is accomplished in the process of fluidizing a titanium dioxide filter or press cake and then drying the same, through the addition to the filter or press cake of one or more alkaline water-soluble zirconium reagents selected from ammonium zirconyl carbonate, the water-soluble ammonium zirconyl carboxylates and mixtures of these. Aqueous solutions of such zirconium reagents, in addition to being effective for imparting a zirconia surface treatment to the titanium dioxide materials, also prove to be effective fluidizing agents for forming high solids dispersions of the zirconia-treated titanium dioxide pigment materials which can be spray dried without substantial dilution and excessive energy requirements.

11 Claims, No Drawings

PROCESS FOR MANUFACTURING ZIRCONIA-TREATED TITANIUM DIOXIDE PIGMENTS

FIELD OF THE INVENTION

This invention relates to an improved method for manufacturing titanium dioxide pigments containing inorganic surface treatments comprising zirconia. The pigments of this invention are useful in coatings, in plastics and in paper.

BACKGROUND OF THE INVENTION

Inorganic pigments are used as opacifiers and colorants in many industries including the coatings, plastics, and paper industries. In general, the effectiveness of the pigment in such applications depends on how evenly the pigment can be dispersed. For this reason, pigments are generally handled in the form of a finely divided powder. For example, titanium dioxide, the most widely used white pigment in commerce today due to its ability to confer high opacity when formulated into end-use products, is generally handled in the form of a finely divided powder. However, titanium dioxide powders are inherently dusty and frequently exhibit poor powder flow characteristics, especially during formulation, compounding, and manufacture of end-use products. While free-flowing powders with low dust properties can be obtained through known manufacturing practices, these powders usually exhibit reduced opacifying properties.

To this end, chemical methods of modification of titanium dioxide pigment surfaces have been developed to achieve the desired balance of pigment opacity and flow characteristics. For instance, it is known in the art that the wetting and dispersing properties of titanium dioxide pigments can be improved by the deposition of inorganic metal oxides and/or metal hydroxides onto the surface of a titanium dioxide intermediate, such as produced, for example, by the vapor phase oxidation of titanium tetrachloride. Processes and apparatus for the vapor phase oxidation of titanium tetrachloride are well-known, see, for example, U.S. Pat. Nos. 3,208,866, 3,512,219, 5,840,112, 6,207,131 and 6,350,427, wherein typically the titanium dioxide intermediate is cooled immediately upon leaving the reactor to yield a solid, agglomerated material which is then further processed in order to provide a finished product. Conventionally the further processing of the agglomerated intermediate involves the following:

(1) dispersing the intermediate (or crude) material in an aqueous medium using a dispersing agent such as a polyphosphate, (2) wet milling the resulting slurry, (3) precipitating one or more inorganic oxides, for example silica and/or alumina, onto the particle surfaces of the wet milled titanium dioxide slurry, (4) recovering the inorganic oxide-treated titanium dioxide pigment from the aqueous slurry by filtration, (5) washing the filtered product to remove residual salts and impurities, (6) drying the washed filtered product, and (7) dry-milling the dried pigment using a fluid energy mill.

The deposition of inorganic oxides according to step (3) provides some desired pigment end-use properties, and typically also provides improvements in the further processing of the pigment. For example, silica is typically added to impart improved resistance to the deleterious effects of ultraviolet light in pigmented end-use applications, whereas alumina is typically added to ensure smooth processing through filtration, drying, and fluid energy milling, as well as to impart improved dispersibility characteristics to the finished pigment in end-use applications.

It is also known in the art to chemically treat pigment intermediates, and in particular titanium dioxide, with zirconium compounds, in order to further impart improved gloss and durability properties to the final pigment product. Given the high efficiency with which zirconium compounds impart their known benefits, it is not surprising that many patents have been issued describing methods for improving pigments, including titanium dioxide, wherein zirconia is deposited onto the pigment surface.

U.S. Pat. No. 4,405,376, for example, discloses a titanium dioxide pigment along with a process for producing the pigment, where the pigment displays improved durability and dispersibility and comprises a pigmentary titanium dioxide core particle, an inner coating of hydrous oxides of tin and zirconium, and an outer coating of hydrous oxide of aluminum.

U.S. Pat. No. 4,450,012 discloses coated mixed phase rutile pigments having a first coating of an oxide or hydrated oxide of titanium, zirconium, tin or a mixture of these and a subsequent coating of an oxide or hydroxide of aluminum, which pigments resist flocculation when formulated in lacquers hardened with acid catalysts.

U.S. Pat. No. 4,640,716 claims a pigment comprising a zirconium-treated uncalcined kaolin clay, made by combining the clay with an added source of zirconium ion under conditions including the absence of deleterious amounts of a binder and the presence of at least a sufficient amount of the zirconium ion source to enhance the optical character of a substrate containing the dry pigment. The preferred zirconium ion source is ammonium zirconium carbonate. The pigments are useful in providing smooth, opaque surface finishes on fibrous web substrates such as high quality printing papers.

U.S. Pat. No. 4,759,800 teaches a process for the improvement of zirconia treated titanium dioxide pigments by a post-treatment wherein the titanium dioxide pigment is treated with an aqueous titanium oxide chloride solution, and optionally, other oxide-forming water-soluble metal salts. The pigments so produced are said to exhibit improved weather resistance and optical properties.

U.S. Pat. No. 5,203,916 describes a pigmentary titanium composite possessing good durability and excellent optical properties, consisting essentially of a particulate titanium dioxide base, a hydrous zirconium oxide layer deposited on the titanium dioxide base, and a hydrous alumina layer deposited on the hydrous zirconium oxide layer. The invention also claims the process for producing such a pigment.

U.S. Pat. No. 5,755,870 describes titanium dioxide-based composite aggregate pigments, also described as chemically aggregated extender pigment composites, produced through the aggregation of titanium dioxide and calcined clay with zirconium hydroxy complex chemicals in a slurry having a pH range of 6.0 to 10.5. Superior optical properties are attributed to the pigments, after the pigments are removed from the slurry and heat treated.

U.S. Pat. No. 5,814,143 discloses synthetic alkali metal silicate pigments surface-modified with oxy-hydroxy zirconium species, and methods for their manufacture. These compositions are said to provide improvements over conventional synthetic alkali metal silicate pigments in terms of optical properties, particularly in paper applications, and physical properties, particularly in rubber applications. In addition, these surface-modified pigments are indicated as useful extender or replacement pigments for titanium dioxide or other synthetic alkali metal or clay aluminosilicate pigments.

U.S. Pat. No. 5,846,310 describes spherical silicon dioxide particles with a size of from 5 to 500 nm coated with titanium dioxide, ferric oxide, or zirconium dioxide particles with a size of less than 60 nm. The coated particles can be after-coated with silanes or further metal oxides. The products obtained are used for pigmenting paints, printing inks, plastics, and coatings or as sunscreen agents.

U.S. Pat. No. 5,976,237 discloses durable coated inorganic pigments with good optical properties, dispersibility, and chemical stability in both paint and plastics applications, which pigments comprise a first coating of alumina, silica, or mixtures thereof deposited on said inorganic pigment prior to said pigment's passing through its isoelectric point, an optional coating selected from the group consisting of zirconia, stannic oxide, silica, titania, and cerium oxide, and mixtures thereof deposited over said first coating after said pigment has passed through its isoelectric point; and a final coating of alumina deposited over the first coating and optional coating. The preferred inorganic pigment is titanium dioxide.

U.S. Pat. No. 6,200,375 concerns a surface-treated titanium dioxide pigment for use in high quality exterior paints. The aforementioned surface treatment comprises a layer of zirconium hydroxide or oxyhydroxide, then a layer of titanium hydroxide or oxyhydroxide, then a layer of co-precipitated phosphate and silica, and finally a layer of aluminum oxyhydroxide. These pigments are also described as useful in plastics and paper laminates.

U.S. Pat. No. 6,656,261 B2 describes substantially sulfate-free titanium dioxide pigments with improved gloss and/or durability comprising alumina, zirconia, and optionally, phosphate compounds, and methods of making these pigments. These pigments are useful in the manufacture of paints and plastics. This patent also claims a method comprising wet treating titanium dioxide with first, an alumina compound to form an alumina layer, followed sequentially by wet treatment with a zirconia compound to form a zirconia layer, but nothing is taught as to the expected outcome. The claiming of an outer zirconia layer is in sharp contrast with the other references known to the inventors and describing the use of a zirconia inorganic oxide treatment, wherein the deposition of zirconia has been carried out as an intermediate step only and a final alumina treatment has been applied in order to ensure the pigment's compatibility with modern ingredients used in paints, plastics, and paper, for instance.

U.S. Patent Application 20060032402 relates to a weather resistant titanium dioxide pigment with good optical properties, having a multi-layered dense silicon dioxide skin doped with metal ions selected from the group comprising tin, zirconium, and titanium, wherein at least one of the two or more dense silicon dioxide layers does not contain any significant quantity of metal atoms other than silicon. The pigment is particularly suitable for use in surface coatings and plastics.

U.S. Patent Application 20060034739 relates to a method for the post-treatment of titanium dioxide resulting in weather-resistant titanium dioxide pigments with good optical properties, wherein together with the hydrous oxides of tin and zirconium, at least one other oxide from the group comprising aluminum, silicon, and titanium is additionally precipitated onto the particle surface. The resulting pigment is particularly suitable for use in paints, coatings, and plastics.

In those documents cited above where enough details are provided to fully discern the conditions under which zirconia is deposited onto a pigment surface, and with particular reference to titanium dioxide pigments, the methods disclosed typically describe procedures wherein zirconia is deposited under initially acidic pH conditions, as for instance U.S. Pat. Nos. 4,405,376; 4,450,012; 5,203,916; 6,200,375; 6,656,261, and U.S. Patent Application Publication 20060034739, in order to take full advantage of commercially available salts of zirconium, which are typically soluble in water only under acidic conditions, and usually impart an acid response when dissolved. Thus it is not surprising that zirconia deposition is largely prescribed at low pH. In the few cases where zirconia treatment is taught as being carried out under alkaline pigment surface treatment conditions, for instance U.S. Pat. No. 4,759,800, and U.S. Patent Application Publications 20060032402 and 20060034739, it is not clear that any advantage accrues from the addition of the preferred acidic salts of zirconium into an alkaline treatment environment.

Given the extensive prior art relating to the known benefits imparted by deposited zirconia to titanium dioxide pigments, and despite all the work and effort previously documented relating to the development of improved zirconia treatment processes for titanium dioxide pigments, further improvements are continually being sought, especially given the high raw material cost of zirconium chemicals in general. In none of the aforementioned references are processes for the manufacture of zirconia-treated pigments described which would anticipate the advantages achieved according to the instant invention, details of which are provided below.

SUMMARY OF THE PRESENT INVENTION, AND DETAILED DESCRIPTION OF PREFERRED EMBODIMENTS

The present invention provides a unique process for the deposition of zirconia onto a titanium dioxide intermediate, wherein the deposition occurs under alkaline conditions and in the process of drying a titanium dioxide filter cake intermediate. In a further aspect, the present invention also provides an improved method for carrying out the fluidization and efficient spray drying of said pigment filter cake (or press cake).

An improved process according to the present invention comprises:

(a) forming a mixture comprising a titanium dioxide material in water;

(b) wet milling said mixture;

(c) after step (b), optionally depositing on said wet milled titanium dioxide material one or more inorganic oxides selected from the oxides of aluminum, boron, cerium, phosphorus, silicon, tin, titanium and zirconium;

(d) adjusting the pH of the slurry resulting from steps (b) or (c) to a value of between about 5 and about 9, in order to flocculate said titanium dioxide material whereby the titanium dioxide material may be recovered by vacuum or pressure filtration;

(e) after step (d), removing said titanium dioxide material from said mixture by vacuum or pressure filtration;

(f) after step (e), washing said titanium dioxide material;

(g) after step (f), converting said washed titanium dioxide material to a preferably high solids fluid dispersion via addition of one or more alkaline water-soluble zirconium reagents selected from ammonium zirconyl carbonate and the water-soluble ammonium zirconyl carboxylates, and mixtures of these;

(h) after step (g), drying the dispersion to yield a dry zirconia surface treated titanium dioxide pigment powder.

The pigment powder may then optionally be post-processed in a fluid energy mill in the presence or absence of additional functional additives known to the art, to finally yield a dry finished pigment product that is well-suited for incorporation into coatings, in paper or in plastics as desired.

In general, any type of titanium dioxide material can be processed in accordance with the instant invention. Preferred is rutile titanium dioxide material. Most preferred is rutile titanium dioxide which has been produced from titanium tetrachloride using a vapor phase oxidation step. The titanium dioxide material can also contain an amount of alumina, from aluminum chloride which has been conventionally added as a rutilization aid during the vapor phase oxidation step along with the titanium tetrachloride. Other inorganic oxides formed during the oxidation step may be present as well, to the extent one skilled in the art may wish to incorporate other oxidizable inorganic materials in the oxidation step as has been described or suggested elsewhere for various purposes, for example, particle size control; see, for instance, U.S. Pat. Nos. 3,856,929, 5,201,949, 5,922,120 and 6,562,314. Preferably, other than such "burned-in" inorganic oxides, the titanium dioxide will not have been treated with other inorganic oxides prior to being so treated according to the process of the present invention.

The system used in the wet milling step of the inventive method can be a disk-type agitator, a cage-type agitator, or generally any other type of wet milling system commonly used in the art. The milling media employed can be sand, glass beads, alumina beads, or generally any other commonly used milling media. The individual grains, particles, or beads of the milling media will preferably be denser than the aqueous slurry used in forming the titanium dioxide dispersion.

Following the wet milling step, inorganic coatings can optionally be applied, utilizing any of the known processes to effect deposition of inorganic oxides onto the titanium dioxide. The particular inorganic oxides applied and the manner of their application are not critical, and various possibilities are well known to those skilled in the art, so further detail on this aspect is not necessary. By way of example of known inorganic oxide treatment protocols, for plastics end-use applications U.S. Pat. Nos. 5,332,433 and 5,700,318 describe inorganic treatment protocols, as do U.S. Pat. Nos. 5,203,916 and 5,976,237 for coatings end use applications.

The pH of the titanium dioxide dispersion is then adjusted to cause the titanium dioxide material to flocculate. Preferably, a sufficient amount of an acid or base is added to the dispersion during this step to bring the pH of the dispersion to a value in the range of from about 5 to about 9. Most preferably, the pH of the dispersion is adjusted during this step to a value of at least about 5.5 up to about 8.

The flocculated titanium dioxide is then filtered using a vacuum-type filtration system or a pressure-type filtration system and is washed. At this point, the washed normally solid or semi-solid titanium dioxide material, typically having a titanium dioxide solids content of from about 40 percent to about 70 percent by weight and a Brookfield viscosity of more than 10,000 cps, is converted to a fluid dispersion via the direct addition of an aqueous solution of the alkaline water-soluble zirconium reagent, and/or additional water, with mixing. In one embodiment, the semi-solid material is converted to a fluid dispersion without substantial dilution of the titanium dioxide material with additional water, such that the titanium dioxide solids content is preferably at least about 50 percent, more preferably being at least about 55 percent and most preferably being at least about 60 percent. Preferably, the viscosity of the slurry characterized by these high solids levels will be less than about 1000 cps. More preferably the viscosity of the slurry will be less than about 500 cps, and most preferably less than about 100 cps.

The alkaline water-soluble zirconium reagent is selected from ammonium zirconyl carbonate and the water-soluble ammonium zirconyl carboxylates (or mixtures of the foregoing, if desired), exemplary water-soluble ammonium zirconyl carboxylates comprising ammonium zirconyl acetate and ammonium zirconyl formate, and is preferably added as a pre-dissolved solution of said reagent in water at concentrations between about 20% and 50%, by weight of solution, of zirconium reagent. Preferably, the amount of water-soluble zirconium reagent used represents between about 0.05% and 1.5%, by weight of finished pigment, of deposited zirconia, and most preferably representing between about 0.1% and 0.5%, by weight of finished pigment, of deposited zirconia. Under these preferred conditions, it is usually possible to achieve an optimum balance of pigment properties together with fluidization of the pigment filter cake intermediate requiring minimum amounts of additional water.

The resulting aqueous dispersion of titanium dioxide is then dried using any of the procedures known in the art, including vacuum drying, spin-flash drying, or spray drying to produce a dry titanium dioxide pigment powder. The preferred method is spray drying. The dry product thus produced can be conventionally milled or ground to a desired final particle size distribution using, for example, steam micronization in the presence or absence of additional functional additives as known in the art.

The titanium dioxide pigment powder produced by the process of the present invention is especially suited for use in coatings, cosmetics, and in thermoplastics.

The following examples serve to illustrate specific embodiments of the instant invention without intending to limit or restrict the scope of the invention as disclosed herein. Concentrations and percentages are by weight unless otherwise indicated.

ILLUSTRATIVE EXAMPLES

Example 1 and Comparative Example 1

Particulate titanium dioxide pigment intermediate obtained from the vapor phase oxidation of titanium tetrachloride containing 1.0% alumina in its crystalline lattice was dispersed in water in the presence of 0.15% by weight (based on pigment) of sodium hexametaphosphate dispersant, along with a sufficient amount of sodium hydroxide to adjust the pH of the dispersion to at least about 9.5, to achieve an aqueous dispersion with a solids content of 35% by weight. The resulting titanium dioxide slurry was sand milled, using a zircon sand-to-pigment weight ratio of 4 to 1, until a volume average particle size was achieved wherein more than 90% of the particles were smaller than 0.63 microns, as determined utilizing a Microtrac X100 Particle Size Analyzer (Microtrac Inc. Montgomeryville, Pa.).

The resulting slurry, diluted to 30% solids by weight, was heated to 90° C. then treated with 3.0% silica, calculated by weight of the final pigment, added over 20 minutes in the form of a 250 gram/liter aqueous sodium silicate solution ($SiO_2$:$Na_2O$). While maintaining the temperature at 90° C., the pH of the slurry was slowly, over a period of 55 minutes, decreased to about 5.0 using 25% by weight aqueous sulfuric acid solution. Following a digestion period of 15 minutes, 2.0% alumina, by weight of final pigment, was added over 15 minutes as a 357 gram/liter aqueous sodium aluminate solution while maintaining the pH of the slurry between a value of 8.0 and 8.5 via the concomitant addition of 25% aqueous sulfuric acid.

The dispersion was allowed to equilibrate at 90° C. for 15 minutes, at which point the pH of the slurry was re-adjusted to 5.8, prior to filtration while hot. The resulting filter cake was washed with water which had been preheated to 60° C. and pre-adjusted to a pH of 7.0, in an amount equal to the weight of recovered pigment.

The washed semi-solid filter cake was subsequently re-dispersed in water with agitation, in the presence of 0.50% by weight based on pigment, of a 45% by weight aqueous solution of ammonium zirconyl carbonate (20% active zirconia equivalent), representing 0.1% by weight of finished pigment of deposited zirconia, to yield a titanium dioxide slurry containing approximately 57% by weight of pigment. The resulting pigment dispersion was spray dried using an APV Nordic PSD52 Spray Dryer (Invensys APV Silkeborg, Denmark), maintaining a dryer inlet temperature of approximately 280° C., to yield a dry pigment powder. The dry pigment powder was then steam micronized in the presence of 0.35% by weight based on pigment of trimethylol propane, utilizing a steam to pigment weight ratio of 2.5, with a steam injector pressure set at 146 psi and micronizer ring pressure set at 118 psi, completing the finished pigment preparation.

As a comparative example, the same procedure described above was repeated, but in the absence of the addition of the ammonium zirconyl carbonate reagent to the washed semi-solid filter cake. The omission of the ammonium zirconyl carbonate reagent led to a required dilution of the semi-solid filter cake, to 35% by weight of solids in water, in order to achieve sufficient fluidity for spray drying, in turn resulting in a correspondingly longer cycle-time and higher energy costs.

To confirm the successful incorporation of the zirconium reagent, the zirconia content of the pigment produced according to the inventive example was determined via known X-ray fluorescence techniques utilizing a PANalytical PW2404 Spectrometer (PANalytical B. V. Almelo, The Netherlands), with appropriate calibration to standards and matrix corrections.

To help determine the degree of uniformity of incorporation of the deposited zirconia according to the process of the instant invention, pigment photocatalytic activity was determined utilizing the technique documented in T. I. Brownbridge and J. R. Brand, "Photocatalytic Activity of Titanium Dioxide Pigment", *Surface Coatings Australia*, September 1990, pages 6-11 (paper presented at the 32nd Annual SCAA Convention, Perth, Wash., September 1990), as referenced and described in U.S. Pat. No. 5,730,796. This involves the steps of: (1) placing about 0.2 g of the $TiO_2$ product in about 40 ml of spectroscopic-grade isopropanol; (2) exposing the $TiO_2$/isopropanol composition to ultraviolet light; (3) monitoring the formation of acetone in the test composition over time; (4) determining, by linear regression analysis, a linear rate of acetone formation in the test composition; and (5) multiplying the calculated rate value by a factor of 1000.

The resulting value (reported as High Sensitivity Photocatalytic Activity (or HSPCA) slope) is proportional to the photocatalytic response of the pigment upon exposure to ultraviolet light, and provides a measure of accelerated weathering performance of the pigment product. Smaller values indicate greater suppression of inherent titanium dioxide pigment photocatalytic activity resulting from the efficient and uniform incorporation of zirconia onto the pigment surface. Results are provided in Table I for the inventive example including zirconia via the ammonium zirconyl carbonate reagent and for the comparative example omitting treatment with this material.

TABLE 1

Pigment Zirconia Content and Photocatalytic Activity Value

| Pigment Sample | Measured Zirconia content (wt. %) | HSPCA slope |
| --- | --- | --- |
| Example 1 | 0.10 | 1.1 |
| Comparative Example 1 | none | 2.5 |

The detailed description and data provided above clearly illustrate the novel process of the instant invention versus processes of the prior art, wherein according to the inventive process zirconia is deposited onto a titanium dioxide pigment while also drying the pigment, the pigment having had deposited thereon, in two previous sequential steps, inorganic oxide surface treatments of 3.0% silica and 2.0% alumina (both by weight of the pigment). Improved manufacturing efficiency is achieved through the combining of the zirconia treatment and drying steps, as well as from the shortened drying times and reduced energy consumption. The resulting titanium dioxide pigment would be particularly useful in the production of end-use articles and compositions including plastics and coatings.

Example 2 and Comparative Example 2

Particulate titanium dioxide pigment intermediate obtained from the vapor phase oxidation of titanium tetrachloride containing 1.0% burned-in alumina was dispersed in water in the presence of 0.15% by weight (based on pigment) of sodium hexametaphosphate dispersant, along with a sufficient amount of sodium hydroxide to adjust the pH of the dispersion to at least 9.5, to achieve an aqueous dispersion with a solids content of 35% by weight. The resulting titanium dioxide slurry was sand milled, using a zircon sand-to-pigment weight ratio of 4 to 1, until a volume average particle size was achieved wherein more than 90% of the particles were smaller than 0.63 microns, as determined utilizing a Microtrac X100 Particle Size Analyzer.

The resulting slurry, diluted to 30% solids by weight, was heated to 90° C. then treated with 3.0% silica, calculated on the weight of final pigment, added over 20 minutes in the form of a 250 gram/liter aqueous sodium silicate solution ($SiO_2$:$Na_2O$). While maintaining the temperature at 90° C., the pH of the slurry was slowly, over a period of 55 minutes, decreased to 5.0 using 25% by weight aqueous sulfuric acid solution. Following a digestion period of 15 minutes, 2.0% alumina, by weight of final pigment, was added over 15 minutes in the form of a 357 gram/liter aqueous sodium aluminate solution, while maintaining the pH of the slurry between a value of 8.0 and 8.5 via the concomitant addition of 25% aqueous sulfuric acid.

The dispersion was allowed to equilibrate at 90° C. for 15 minutes, at which point the pH of the slurry was re-adjusted to 5.8, prior to filtration while hot. The resulting filter cake was washed with water which had been preheated to 60° C. and pre-adjusted to a pH of 7.0, in an amount equal to the weight of recovered pigment.

The washed semi-solid filter cake was subsequently re-dispersed in a minimum amount of water with agitation and in the presence of 1.0%, by weight based on pigment, of a 45% by weight aqueous solution of ammonium zirconyl carbonate (20% active zirconia equivalent), representing 0.2% by weight of finished pigment of deposited zirconia, to yield a titanium dioxide slurry containing approximately 62% by weight of pigment. The resulting pigment dispersion was spray dried using an APV Nordic PSD52 Spray Dryer, maintaining a dryer inlet temperature of approximately 280° C., to yield a dry pigment powder. The dry pigment powder was then steam micronized in the presence of 0.35% by weight based on pigment of trimethylol propane, utilizing a steam to pigment weight ratio of 2.5, with a steam injector pressure set at 146 psi and micronizer ring pressure set at 118 psi, completing the finished pigment preparation.

As a comparative example, the same procedure described above was repeated, but in the absence of the addition of the ammonium zirconyl carbonate reagent to the washed semi-solid filter cake. The omission of the ammonium zirconyl carbonate reagent led to a required dilution of the semi-solid filter cake to 35% by weight in water in order to achieve sufficient fluidity for spray drying, in turn resulting in a correspondingly longer cycle-time and higher energy costs.

The pigment produced according to the inventive example was tested for its zirconia content as described in Example 1, and both the inventive and comparison pigments were tested for photocatalytic activity, again as described in Example 1. Results are provided in Table 2.

TABLE 2

Pigment Zirconia Content and Photocatalytic Activity Value

| Pigment Sample | Measured Zirconia content (wt. %) | HSPCA slope |
|---|---|---|
| Example 2 | 0.20 | 0.9 |
| Comparative Example 2 | none | 2.4 |

Example 2 further illustrates the novel process of the instant invention, wherein zirconia is deposited onto a titanium dioxide pigment in the process of also drying the pigment, the pigment in question having had deposited thereon, in two previous sequential steps, inorganic oxide surface treatments of 3.0% silica and 2.0% alumina (both by weight of the pigment). Improved manufacturing efficiency is achieved through the combining of the zirconia treatment and drying steps, as well as from the shortened drying times and reduced energy consumption. The resulting titanium dioxide pigment would be particularly useful in the production of end-use articles and compositions including plastics and coatings.

Example 3 and Comparative Example 3

Particulate titanium dioxide pigment intermediate obtained from the vapor phase oxidation of titanium tetrachloride containing 1.0% burned-in alumina was dispersed in water in the presence of 0.15% by weight (based on pigment) of sodium hexametaphosphate dispersant, along with a sufficient amount of sodium hydroxide to adjust the pH of the dispersion to at least 9.5, to achieve an aqueous dispersion with a solids content of 35% by weight. The resulting titanium dioxide slurry was sand milled, using a zircon sand-to-pigment weight ratio of 4 to 1, until a volume average particle size was achieved wherein more than 90% of the particles were smaller than 0.63 microns, as determined utilizing a Microtrac X100 Particle Size Analyzer.

The resulting slurry, diluted to 30% solids by weight, was heated to 90° C. then treated with 3.0% silica, calculated on the weight of the final pigment, added over 20 minutes in the form of a 250 gram/liter aqueous sodium silicate solution ($SiO_2$:$Na_2O$). While maintaining the temperature at 90° C., the pH of the slurry was over a 55 minute period slowly decreased to a value of 5.0, using 25% by weight aqueous sulfuric acid solution. Following a digestion period of 15 minutes, 2.0% alumina, by weight of final pigment, was added over 15 minutes as a 357 gram/liter aqueous sodium aluminate solution while maintaining the pH of the slurry between a value of 8.0 and 8.5 via the concomitant addition of 25% aqueous sulfuric acid.

The dispersion was allowed to equilibrate at 90° C. for 15 minutes, at which point the pH of the slurry was re-adjusted to 5.8, prior to filtration while hot. The resulting filter cake was washed with water which had been preheated to 60° C. and pre-adjusted to a pH of 7.0, in an amount equal to the weight of recovered pigment.

The washed semi-solid filter cake was subsequently re-dispersed with agitation in the presence of 2.5%, by weight based on pigment, of a 45% by weight aqueous solution of ammonium zirconyl carbonate (20% active zirconia equivalent), representing 0.5% by weight of finished pigment of deposited zirconia, to yield a titanium dioxide slurry containing approximately 63% by weight of pigment. The resulting pigment dispersion was spray dried using an APV Nordic PSD52 Spray Dryer, maintaining a dryer inlet temperature of approximately 280° C., to yield a dry pigment powder. The dry pigment powder was then steam micronized in the presence of 0.35% by weight based on pigment of trimethylol propane, utilizing a steam to pigment weight ratio of 2.5, with a steam injector pressure set at 146 psi and micronizer ring pressure set at 118 psi, completing the finished pigment preparation.

As a comparative example, the same procedure described above was repeated, but in the absence of the addition of the ammonium zirconyl carbonate reagent to the washed semi-solid filter cake. A dilution was required of the semi-solid filter cake in this comparative example, to 35% by weight in water, in order to achieve sufficient fluidity for spray drying, which in turn resulted in a longer cycle-time and higher energy costs.

The pigment produced by the inventive example was tested for zirconia content as in Example 1, and both the inventive example and comparative example pigments were tested for photocatalytic activity, again as described in Example 1. Results are provided in Table 3.

TABLE 3

Pigment Zirconia Content and Photocatalytic Activity Value

| Pigment Sample | Measured Zirconia content (wt. %) | HSPCA slope |
|---|---|---|
| Example 3 | 0.50 | 0.7 |
| Comparative Example 3 | none | 2.4 |

Example 3 still further illustrates the novel process of the instant invention, wherein zirconia is deposited onto a titanium dioxide pigment in the process of drying the pigment, the pigment in question having had deposited thereon, in two previous sequential steps, inorganic oxide surface treatments of 3.0% silica and 2.0% alumina (both by weight of the pigment). Improved manufacturing efficiency is achieved through the combining of the zirconia treatment and drying steps, as well as from the shortened drying times and reduced energy consumption. The resulting titanium dioxide pigment would be particularly useful in the production of end-use articles and compositions including plastics and coatings.

Example 4 and Comparative Example 4

Particulate titanium dioxide pigment intermediate obtained from the vapor phase oxidation of titanium tetrachloride and containing 0.6% alumina in its crystalline lattice was dispersed in water in the presence of 0.18% by weight (based on pigment) of sodium hexametaphosphate dispersant, along with a sufficient amount of sodium hydroxide to adjust the pH of the dispersion to a minimum value of 9.5, to achieve an aqueous dispersion with a solids content of 35% by weight.

The resulting titanium dioxide slurry was sand milled, using a zircon sand-to-pigment weight ratio of 4 to 1, until a volume average particle size was achieved wherein more than 90% of the particles were smaller than 0.63 microns, as determined utilizing a Microtrac X100 Particle Size Analyzer. The slurry was heated to 50° C., acidified to a pH of about 5.0 using concentrated sulfuric acid, then treated with 0.25% zirconia, added rapidly as a 200 gram/liter aqueous zirconium orthosulfate solution, over a five minute period. After the addition of the zirconium orthosulfate, the slurry was maintained at 50° C., adjusted to a pH of 8.0 using 20% by weight aqueous sodium hydroxide solution, then treated with 2.8% alumina, added as a 357 gram/liter aqueous sodium aluminate solution over a fifteen minute period. During the addition of the sodium aluminate solution, the pH of the slurry was maintained between a value of 8.0 and 8.5 via the addition of sulfuric acid, prior to an additional 15 minute digestion at 50° C. The dispersion was then filtered while hot.

The resulting filter cake was washed with an amount of water, which had been preheated to 60° C. and pre-adjusted to a pH of 7.0, equal to the weight of recovered pigment. The washed filter cake was subsequently re-dispersed in water with agitation in the presence of 0.35% by weight based on pigment of trimethylol propane, and 1.0%, by weight based on pigment, of a 45% by weight aqueous solution of ammonium zirconyl carbonate (20% active zirconia equivalent), representing 0.2% by weight of finished pigment of deposited zirconia, to yield a titanium dioxide slurry containing approximately 35% by weight of pigment.

The resulting pigment dispersion was spray dried using an APV Nordic PSD52 Spray Dryer, maintaining a dryer inlet temperature of approximately 280° C., to yield a dry pigment powder. The dry pigment powder was then steam micronized, utilizing a steam to pigment weight ratio of 2.5, with a steam injector pressure set at 146 psi and micronizer ring pressure set at 118 psi, completing the finished pigment preparation.

As a comparative example, the same procedure described above was repeated, but in the absence of the addition of the ammonium zirconyl carbonate reagent to the washed semi-solid filter cake.

The pigments produced according to the inventive and comparative examples were tested for zirconia content and photocatalytic activity as in Example 1. Results are provided in Table 4.

TABLE 4

Pigment Zirconia Content and Photocatalytic Activity Value

| Pigment Sample | Measured Zirconia content (wt. %) | HSPCA slope |
|---|---|---|
| Example 1 | 0.45 | 10 |
| Comparative Example 4 | 0.25 | 14 |

Example 4 still further illustrates the novel process of the instant invention, wherein zirconia is deposited onto a titanium dioxide pigment in the process of drying the pigment, the pigment having had deposited thereon, in two previous sequential steps, inorganic oxide surface treatments of 0.25% zirconia and 2.8% alumina (both by weight of the pigment). Improved manufacturing efficiency is achieved through the combining of the second zirconia treatment and drying steps. The resulting titanium dioxide pigment would be particularly useful in the production of coatings.

Example 5 and Comparative Example 5

Particulate titanium dioxide pigment intermediate obtained from the vapor phase oxidation of titanium tetrachloride, and containing 1.5% alumina in its crystalline lattice, was dispersed in water in the presence of 0.18% by weight (based on the pigment) of sodium hexametaphosphate dispersant and with sodium hydroxide sufficient to adjust the pH of the dispersion to a minimum value of 9.5, to provide an aqueous dispersion having a solids content of 35% by weight. The resulting titanium dioxide slurry was subjected to sand milling, using a zircon sand-to-pigment weight ratio of 4 to 1, until a volume average particle size was achieved wherein greater than 90% of the particles were smaller than 0.63 microns, as determined utilizing a Microtrac X100 Particle Size Analyzer.

The resulting slurry, diluted to 30% solids by weight, was heated to 60° C. and acidified to a pH of 2.0 using concentrated sulfuric acid, then allowed to digest at 60° C. for 30 minutes. After this, the pigment slurry pH was adjusted to a value of 6.2 using 20% by weight aqueous sodium hydroxide solution, followed by digestion for an additional 30 minutes at 60° C., with final readjustment of the pH to 6.2, if necessary. At this point the dispersion was filtered while hot.

The resulting filter cake was washed with an amount of water, which had been preheated to 60° C. and pre-adjusted to a pH of 7.0, equal to the weight of recovered pigment. The washed semi-solid filter cake was subsequently re-dispersed in water with agitation in the presence of 0.35% by weight based on pigment of trimethylol propane and 1.0%, by weight based on pigment, of a 45% by weight aqueous solution of ammonium zirconyl carbonate (20% active zirconia equivalent), representing 0.2% by weight of finished pigment of deposited zirconia, to yield a titanium dioxide slurry containing approximately 35% by weight of pigment. The resulting pigment dispersion was spray dried using an APV Nordic PSD52 Spray Dryer, maintaining a dryer inlet temperature of approximately 280° C., to yield a dry pigment powder. The dry pigment powder was then steam micronized, utilizing a steam to pigment weight ratio of 2.5, with a steam injector pressure set at 146 psi and micronizer ring pressure set at 118 psi, completing the finished pigment preparation.

As a comparative example, the same procedure described above was repeated, but in the absence of the addition of the ammonium zirconyl carbonate reagent to the washed semi-solid filter cake.

The pigment produced in the inventive example was tested for zirconia content per Example 1, and both pigments were tested for photocatalytic activity also as described in Example 1. Results are provided in Table 5.

TABLE 5

Pigment Zirconia Content and Photocatalytic Activity Value

| Pigment Sample | Measured Zirconia content (wt. %) | HSPCA slope |
|---|---|---|
| Example 5 | 0.20 | 14.5 |
| Comparative Example 5 | none | 23 |

Example 5 further illustrates the novel process of the instant invention, wherein zirconia is deposited onto a titanium dioxide pigment in the process of drying the same, the zirconia treatment in this instance, however, being the only wet inorganic oxide treatment applied to the pigment intermediate. Improved manufacturing efficiency is again achieved through the combining of the zirconia treatment with the drying step. The resulting titanium dioxide pigment produced would be particularly useful in the production of end-use articles and compositions comprising pigmented plastics.

Example 6 and Comparative Example 6

Particulate titanium dioxide pigment intermediate obtained from the vapor phase oxidation of titanium tetrachloride, and containing 0.8% alumina in its crystalline lattice, was dispersed in water in the presence of 0.18% by weight (based on pigment) of sodium hexametaphosphate dispersant along with sufficient sodium hydroxide to adjust the pH of the dispersion to a minimum value of 9.5, to yield an aqueous dispersion with a solids content of 35% by weight. The resulting titanium dioxide slurry was subjected to sandmilling, using a zircon sand-to-pigment weight ratio of 4 to 1, until a volume average particle size was achieved wherein more than 90% of the particles were smaller than 0.63 microns, as determined utilizing a Microtrac X100 Particle Size Analyzer.

The resulting slurry, diluted to 30% solids by weight, was heated to 60° C., acidified to a pH of 2.0 using concentrated sulfuric acid, then treated with 1% alumina, based on titanium dioxide, added as a 357 gram/liter aqueous sodium aluminate solution. During the addition of the sodium aluminate solution, the pH of the slurry was maintained between a value of 8.0 and 8.5 via the addition of sulfuric acid, prior to digestion for 15 minutes at 60° C. After this, the slurry pH was adjusted to a pH of 6.2 with additional sulfuric acid, followed by digestion for an additional 15 minutes at 60° C., followed by a final adjustment of the slurry pH to 6.2. The dispersion was filtered while hot.

The resulting filter cake was washed with an amount of 60° C., pH 7.0 water, equal in weight to the recovered pigment. The washed semi-solid filter cake was subsequently re-dispersed in water with agitation in the presence of 0.35% by weight based on pigment of trimethylol propane and 1.0%, by weight based on pigment, of a 45% by weight aqueous solution of ammonium zirconyl carbonate (20% active zirconia equivalent), representing 0.2% by weight of finished pigment of deposited zirconia, to yield a titanium dioxide slurry containing approximately 35% by weight of pigment. The resulting pigment dispersion was spray dried using an APV Nordic PSD52 Spray Dryer, maintaining a dryer inlet temperature of approximately 280° C., to yield a dry pigment powder. The dry pigment powder was then steam micronized, utilizing a steam to pigment weight ratio of 2.5, with a steam injector pressure set at 146 psi and micronizer ring pressure set at 118 psi, completing the finished pigment preparation.

As a comparative example, the same procedure described above was repeated, but in the absence of the addition of the ammonium zirconyl carbonate reagent to the washed semi-solid filter cake.

The pigment of the inventive example was tested for zirconia content and both pigments for photocatalytic activity, all as described in Example 1. Results are provided in Table 6.

TABLE 6

Pigment Zirconia Content and Photocatalytic Activity Value

| Pigment Sample | Measured Zirconia content (wt. %) | HSPCA slope |
|---|---|---|
| Example 6 | 0.20 | 16 |
| Comparative Example 6 | none | 27 |

Example 6 further illustrates the novel process of the instant invention, wherein zirconia is deposited onto a titanium dioxide pigment in the process of drying the pigment, with the pigment having had deposited thereon, in one previous step, an inorganic oxide surface treatment of 1.0% alumina (by weight of the pigment). Improved manufacturing efficiency is achieved through the combining of the zirconia treatment with the drying step. The resulting titanium dioxide pigment would be particularly useful in the production of end-use articles and compositions comprising pigmented plastics.

What is claimed is:

1. A process for manufacturing zirconia-treated titanium dioxide, comprising the steps of:
    a) forming a mixture comprising a titanium dioxide material in water;
    b) wet milling said mixture;
    c) after step b), optionally depositing on said wet milled titanium dioxide material one or more inorganic oxides selected from the group consisting of the oxides of aluminum, boron, cerium, phosphorus, silicon, tin, titanium and zirconium;
    d) achieving a pH of the mixture resulting from steps b) or c) between about 5 and about 9, whereby the titanium dioxide material is sufficiently flocculated to be recovered by vacuum or pressure filtration;
    e) removing said titanium dioxide material from said mixture by vacuum or pressure filtration;
    f) washing the titanium dioxide material recovered by filtration;
    g) converting the washed titanium dioxide material to a fluid dispersion by addition of one or more alkaline water-soluble zirconium reagents selected from the group consisting of ammonium zirconyl carbonate, the water-soluble ammonium zirconyl carboxylates and mixtures of these;
    h) drying the dispersion to yield a dry zirconia surface treated titanium dioxide powder.

2. A process as defined in claim 1, wherein the titanium dioxide material is a rutile titanium dioxide intermediate produced from titanium tetrachloride using a vapor phase oxidation step.

3. A process as defined in claim 2, wherein the titanium dioxide material acted upon possesses a crystalline lattice, and is further characterized in that, other than any inorganic oxides formed in the crystalline lattice of the titanium dioxide intermediate during the vapor phase oxidation step, substantially no inorganic oxides have been deposited on said titanium dioxide material prior to optional step c) or step g).

4. A process as defined in claim 1, wherein after the addition of one or more alkaline water-soluble zirconium reagents, the resulting fluid dispersion is characterized by a titanium dioxide solids content of at least about 50 percent by weight.

5. A process as defined in claim 4, wherein the resulting fluid dispersion is characterized by a titanium dioxide solids content of at least about 55 percent by weight.

6. A process as defined in claim 5, wherein the resulting fluid dispersion is characterized by a titanium dioxide solids content of at least about 60 percent by weight.

7. A process as defined in claim 1, wherein the one or more alkaline water-soluble zirconium reagents are selected from the group consisting of ammonium zirconyl carbonate, ammonium zirconyl acetate, ammonium zirconyl formate and mixtures thereof.

8. A process as defined in claim 1, wherein the one or more alkaline water-soluble zirconium reagents are added in aqueous solution form, in which the zirconium reagent or reagents are present at a concentration of between about 20 percent and about 50 percent.

9. A process as defined in claim 1, wherein the water-soluble zirconium reagents used represents between about 0.05 percent and 1.5 percent by weight of finished pigment of deposited zirconia.

10. A process as defined in claim 1, wherein the water-soluble zirconium reagents used represents between about 0.1 percent and 0.5 percent by weight of finished pigment of deposited zirconia.

11. A process as defined in claim 1, wherein the drying step is performed by spray drying of the dispersion.

* * * * *